Sept. 29, 1931.   E. B. STALEY   1,824,843
TOW HOOK
Filed Jan. 22, 1930   2 Sheets-Sheet 2
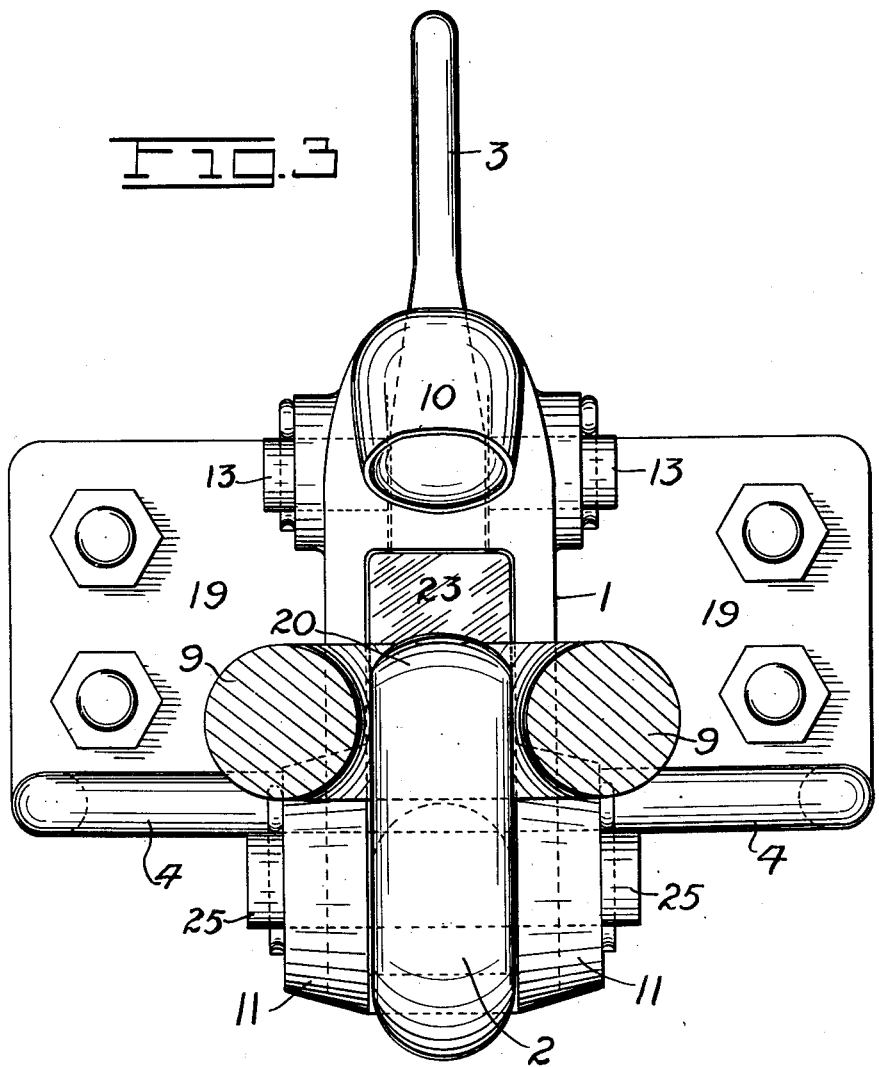
Inventor
*Earl B. Staley*
By Reynolds & Reynolds
Attorneys Patented Sept. 29, 1931

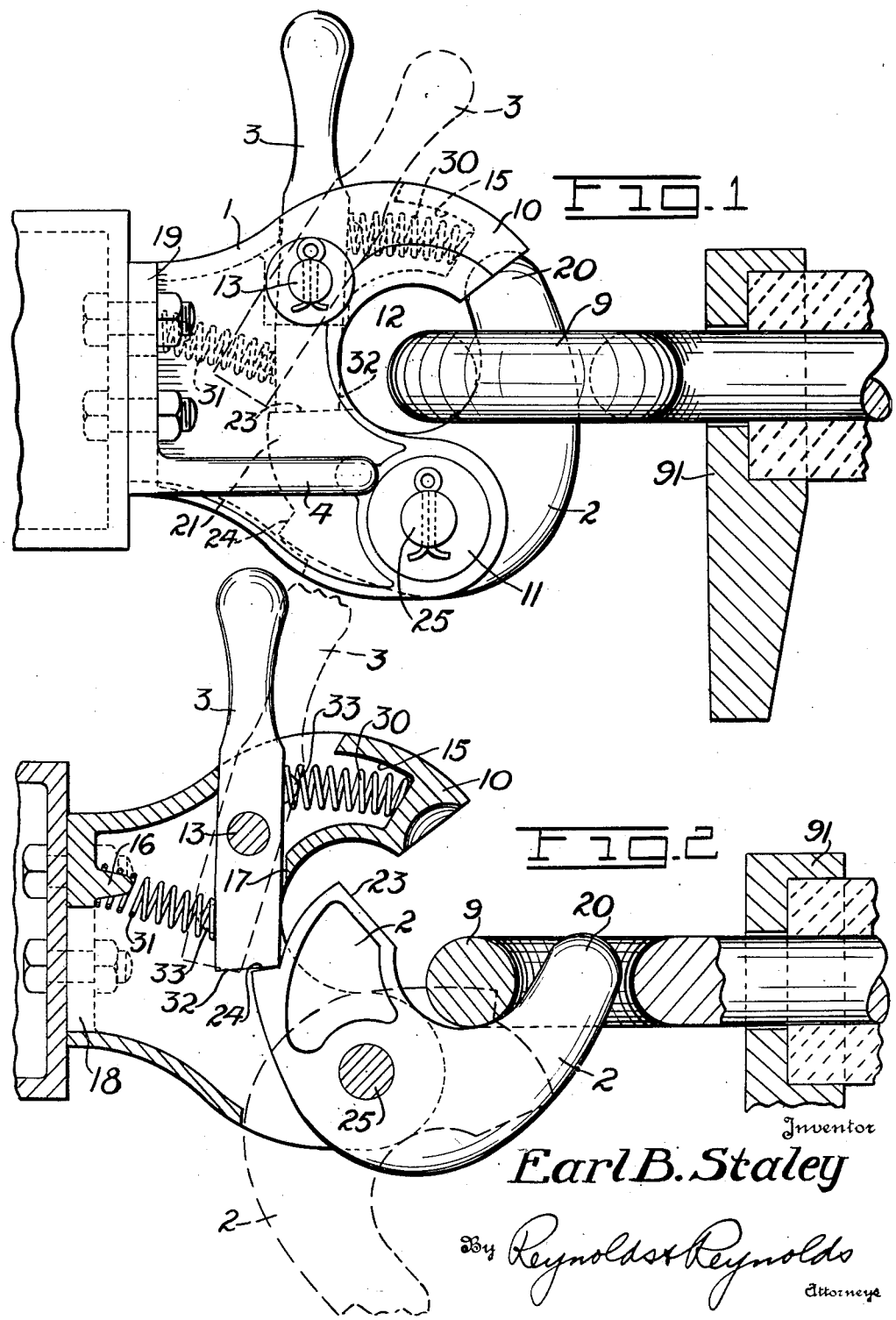

1,824,843

UNITED STATES PATENT OFFICE

EARL B. STALEY, OF SEATTLE, WASHINGTON

TOW HOOK

Application filed January 22, 1930. Serial No. 422,580.

My invention relates to trailer hitches of the general type shown in my Patent No. 1,690,558, and the general object of my present invention is to modify and improve that hitch in details of its operation and in its construction and assembly.

More specifically, one object is so to improve the contour and relative arrangement of the fixed and movable jaws as to permit the eye of a trailer tongue engaged therewith to drop clear by gravity, substantially upon release of the latch bar.

A further object, especially contemplating a hitch improved as indicated above, as well as that type shown in my patent, is to provide means to retain parts in an intermediate position, to facilitate engagement of the eye and hitch.

Another object is so to proportion and arrange parts that a part of the movable jaw acts during opening as a positive ejector to insure disengagement of the eye.

A still further object is to simplify and improve the mechanical construction and ease of assembly of the hitch.

My invention comprises the novel parts and their relative arrangement and combination, as will appear from the drawings, this specification, and the claims concluding the same.

In the accompanying drawings I have shown my invention in the form now preferred by me, it being evident that changes, within the scope of the claims, may be made without departing from my invention.

Figure 1 is a side elevation of my trailer hitch in operative position, engaged with the eye of a trailer tongue, shown partly in section.

Figure 2 is a view partly in section and partly in side elevation, showing parts in an intermediate position, and, in dotted lines, in open position.

Figure 3 is a rear elevation, parts being in position corresponding to the full-line position of Figure 2, and the trailer eye being shown in section.

As in my patent, the present hitch comprises a fixed jaw 1 having upper and lower points 10 and 11, respectively, which define a rearwardly opening recess 12 in which is received the eye 9 at the forward end of a trailer tongue 91, or a like draft member. A movable jaw 2 is pivotally secured by a pin 25, preferably between its ends, upon the lower point 11 of the fixed jaw, which may be bifurcated to receive the movable jaw 2. The movable jaw is preferably somewhat U-shaped or angular, its inner end 21, when the movable jaw is in operative position, extending laterally within the body of the fixed jaw, which preferably is made hollow, and its outer end 20, in such operative position (see Figure 1) extends upwardly to close the gap between the upper and lower points of the fixed jaw, which are substantially one above the other. The tip of the upper point 10 may be concaved to receive the tip of the end 20.

A latch bar 3, projecting upwardly from the fixed jaw 1, is pivoted therein at 13. Its lower end 32 is squared off, as in my patent referred to above, to engage an upwardly facing surface 23 upon the inner end of the movable jaw 2, whereby the latter is held in operative position. Springs 30 and 31, the one received in a socket 15 within the upper point 10, and the other positioned upon a nub 16 within the hollow body of the fixed jaw 1, engage the latch bar at front and rear and above and below its pivot pin 13, respectively, tending to hold it against a stop surface 17 in position to engage the surface 23 of the movable jaw 2. Its upwardly projecting end serves as a handle, whereby it may be released by throwing it into the dotted line positions of Figures 1 and 2. Nubs 33 support the springs 30 and 31 at the latch bar.

The recess 12 is preferably inclined rearwardly as well as downwardly, hence the tendency of an eye 9 laid therein would be to drop outwardly or rearwardly, and thus to free itself by gravity. This tendency is assisted by the conformation of the movable jaw, and its action in swinging into open position. The bottom of the U forming this movable jaw is, in closed or operative position, substantially above the pivot pin 25, and as the jaws open, this point, whereon the eye 9 rests, moves rearwardly and downwardly, over the point 11, until in extreme open position, illustrated in Figure 2 in dotted lines, the U-shaped movable jaw 2 is inverted, and opens downwardly. Thus the eye may drop, and it is engaged, as the opening progresses, by the inner end 21 of the movable jaw, which acts as a follower or ejector to insure disengagement.

Difficulty has been encountered with a hook like that disclosed in my prior patent, in that it is difficult to engage the eye with the hook. It is necessary that one man hold the eye at just the proper elevation, while the truck on which is secured the hook is backed by another man. This is a tedious and somewhat dangerous operation, but cannot well be avoided with the previous arrangement, since there was no means whereby the eye might be supported from the hook, even temporarily, because parts in this hitch are so arranged as normally to open downwardly. Accordingly provision is made to hold the movable jaw in an intermediate position, with its outer end 20 directed somewhat upwardly. This will permit a driver, unaided, to couple the truck and trailer, first placing the eye upon the end 20, as in Figure 2, and then backing the truck to snap the movable jaw 2 into operative position. Various means may be designed to accomplish this, and as illustrative of such a means I may provide a shoulder 24 upon the under side of the movable jaw 2, with which the latch bar 3 will engage, as seen in Figure 2. Thus holding the movable jaw in intermediate position, its outer end 20, which in closed position extends upwardly, now extends outwardly well beyond the upper point 10 of the fixed jaw, thus further facilitating engagement therewith of the eye 9.

The body of the fixed jaw, cast hollow, may have a forwardly directed opening 18 into its interior, through which the spring 31 may be inserted and properly engaged with its nubs 33 and 16. Eyes 4, projecting at either side of the fixed jaw 1, serve as anchors for the securement of safety chains from the trailer, and if cast integral, as shown, serve also in lieu of stiffening webs connecting the fixed jaw and its base flange 19.

What I claim as my invention is:

1. In a tow hook, in combination, a fixed jaw having an upper and a lower point opening rearwardly, a movable jaw pivotally supported upon the lower point of the fixed jaw, and in operative position extending upward to close the gap between the points of the fixed jaw, said movable jaw when unrestrained swinging into a downwardly and rearwardly inclined open position, and releasable means to retain said movable jaw in operative position.

2. In a tow hook, in combination, a fixed jaw having an upper and a lower point opening rearwardly and downwardly, a movable jaw pivotally supported upon the lower point of the fixed jaw, and in operative position extending upward to close the gap between the points of the fixed jaw, said movable jaw when unrestrained swinging into a downwardly and rearwardly inclined open position, and releasable means to hold said movable jaw in operative position, and in a position intermediate the open and the operative positions, inclined upwardly but spaced from the upper point of the fixed jaw.

3. In a tow hook, in combination, a fixed jaw having an upper and a lower point opening rearwardly, a movable jaw pivotally supported upon the lower point of the fixed jaw, and in operative position extending upward to close the gap between the points of the fixed jaw, said movable jaw when unrestrained swinging into a downwardly and rearwardly inclined open position, releasable means to retain said movable jaw in operative position, the movable jaw having an intermediate stop, and the releasable retaining means being engageable therewith to hold the movable jaw in an intermediate position, inclined upwardly but spaced from the upper point of the fixed jaw.

4. In a trailer hitch, in combination, a fixed jaw having an upper and a lower point substantially in vertical alignment, and defining a recess opening rearwardly and downwardly, a U-shaped movable jaw pivoted between its ends upon the lower point of the fixed jaw, and in operative position having its outer end extending upward to close the gap between the points of the fixed jaw, the two jaws being so proportioned and arranged that the movable jaw may swing into an ultimate open position with its two ends projecting rearwardly and downwardly from the lower point of the fixed jaw, and a latch engageable with the movable jaw to retain it either in operative position or in an intermediate position with its outer end projecting upwardly but spaced from the upper point of the fixed jaw sufficiently to permit disengagement of the eye of a trailer tongue which may be engaged therewith.

5. In a trailer hitch, in combination, a fixed jaw having an upper and a lower point spaced to define a rearwardly and downwardly opening recess, a movable jaw pivotally supported between its ends upon the lower point of the fixed jaw, and its outer end in operative position extending upward to close the gap between the points of the fixed jaw, and its inner end having an upwardly facing surface, an upright latch bar having its lower end engaging said surface when the movable jaw is in operative position, a shoulder upon the under side of the movable jaw positioned to be engaged by said latch bar upon movement of the movable jaw, following its release, into an intermediate position, with its outer end projecting upwardly but spaced from the upper point of the fixed jaw.

6. In a trailer hitch, in combination, a hollow fixed jaw having a bifurcated lower point and an internally socketed upper point spaced from the lower point to define a rearwardly opening recess, a movable jaw pivoted between its ends within the bifurcation of the lower jaw, its outer end in operative position closing the gap between the upper and lower points of the fixed jaw, and its inner end extending upward within the fixed jaw, and movable into an open position, an upright pivoted latch bar projecting upwardly from the fixed jaw, and engageable with the inner end of the movable jaw, and a spring received in the socket of the upper point of the fixed jaw tending to retain the latch bar in position to engage the movable jaw.

7. In a trailer hitch, in combination, a hollow fixed jaw having a bifurcated lower point and an upper point spaced from the lower point to define a rearwardly opening recess, a movable jaw pivoted between its ends within the bifurcation of the lower point, its outer end in operative position closing the gap between the upper and lower points of the fixed jaw, and movable into an open position, an upright latch bar pivoted within the forward portion of the fixed jaw, and engageable with the movable jaw to fix the position of the latter, the fixed jaw having a forwardly directed opening, a spring insertible through such opening to engage the latch bar and maintain the same in position to engage the movable jaw, the upper point of the fixed jaw having an internal socket, and a second spring insertible therein through the aperture which receives the latch, said second spring assisting the first spring to maintain the latch bar in jaw-engaging position.

Signed at Seattle, Washington, this 26th day of September, 1929.

EARL B. STALEY.